(12) United States Patent
Zandifar

(10) Patent No.: US 7,869,645 B2
(45) Date of Patent: Jan. 11, 2011

(54) IMAGE CAPTURE AND CALIBRATION

(75) Inventor: Ali Zandifar, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/177,700

(22) Filed: Jul. 22, 2008

(65) Prior Publication Data

US 2010/0021044 A1 Jan. 28, 2010

(51) Int. Cl.
G06K 9/00 (2006.01)
(52) U.S. Cl. ............... 382/147; 382/145; 382/151
(58) Field of Classification Search ......... 382/141, 382/144, 145, 147, 151; 348/187, 188
See application file for complete search history.

(56) References Cited

U.S. PATENT DOCUMENTS

| | | | |
|---|---|---|---|
| 4,185,298 A | 1/1980 | Billet et al. | |
| 4,578,810 A | 3/1986 | MacFarlane et al. | |
| 5,125,040 A * | 6/1992 | Matsui et al. | 382/144 |
| 5,495,535 A * | 2/1996 | Smilansky et al. | 382/145 |
| 5,517,235 A | 5/1996 | Wasserman | |
| 5,966,677 A * | 10/1999 | Fiekowsky | 702/95 |
| 6,219,442 B1 | 4/2001 | Harper et al. | |
| 6,434,264 B1 | 8/2002 | Asar | |
| 6,477,266 B1 | 11/2002 | Asar | |
| 6,535,636 B1 * | 3/2003 | Savakis et al. | 382/173 |
| 6,546,528 B1 | 4/2003 | Sasaki et al. | |
| 6,641,983 B1 | 11/2003 | Lee et al. | |
| 6,681,038 B2 | 1/2004 | Vilella | |
| 6,724,473 B2 | 4/2004 | Leong et al. | |
| 6,728,417 B1 * | 4/2004 | Hara et al. | 382/275 |
| 6,795,186 B2 | 9/2004 | Aspir et al. | |
| 6,884,992 B1 * | 4/2005 | Heiland | 250/234 |
| 6,969,864 B2 | 11/2005 | Ye et al. | |
| 6,970,588 B1 | 11/2005 | Komatsu | |
| 7,027,639 B2 | 4/2006 | Fishbaine | |
| 7,167,583 B1 | 1/2007 | Lipson et al. | |
| 2003/0080727 A1 | 5/2003 | Yamauchi et al. | |
| 2003/0202178 A1 * | 10/2003 | Tsuji et al. | 356/237.2 |
| 2005/0018919 A1 * | 1/2005 | Shiraishi et al. | 382/254 |
| 2006/0018532 A1 * | 1/2006 | Tanaka et al. | 382/145 |
| 2007/0146695 A1 | 6/2007 | Brouwer et al. | |

OTHER PUBLICATIONS

Zhang, Zhengyou ("Flexible Camera Calibration by Viewing a Plane from Unknown Orientations," IEEE, 1999, 8 pages).*
Sturm, Peter et al. ("On Plane-based Camera Calibration: A General Algorithm, Singularities, Applications," IEEE, 1999, 6 pages).*

* cited by examiner

Primary Examiner—Yubin Hung

(57) ABSTRACT

Embodiments of the present invention enable image capture and validation. Certain applications of the present invention are its use in various embodiments of a system for inspection of a printed circuit board ("PCB") substrate. In embodiments, an image capture system comprising a camera and a two-dimensional surface supporting an image may be calibrated based on configuration parameters of an image to be captured and of a simulated reference bitmap based on the image. In embodiments, the position of the image to be captured on the two-dimensional surface is determined based on calibration parameters. In embodiments, consistency of quality of captured images is maintained by validating selected characteristics of each image as it is being captured.

7 Claims, 9 Drawing Sheets reference bitmap
120 input image
140 distortion map
160

IMAGE CAPTURE AND CALIBRATION

BACKGROUND

A. Technical Field

The present invention pertains generally to image processing, and relates more particularly to systems and methods for image capture and calibration.

B. Background of the Invention

In printed circuit board (PCB) manufacturing, a PCB pattern image is printed directly onto a PCB substrate. It is important that this PCB image be as accurate as possible, because errors or aberrations in the image may result in errors in the manufactured PCB substrate.

Typically, a PCB pattern is printed as a dot-pattern image by an industrial inkjet printer. It is important to be able to calibrate such printers as well as perform quality control in order to insure that their printing performance is consistent and meets specifications. An inkjet printer head contains a set of nozzles, and the output of a particular nozzle may be correlated to regions of the dot-pattern image being printed. After periods of printer continuous use, a nozzle may become clogged or otherwise malfunction, which could lead to errors or aberrations in the image being printed.

Ceramic PCB substrates with a pattern printed by industrial inkjet printers typically are cured between successive printing cycles by a baking process. The presence of surface contaminants and the act of curing may result in the distortion of printed features. In addition to uniform shrinkage, the printed pattern is also subject to non-uniform shrinkage based on the local geometry of printed material. Distortions in the printed pattern and misfiring ink jet nozzles may also create circuit errors such as open and short circuits (topological distortions), and misalignment of circuit features (geometric distortions) between multiple printing passes.

If a nozzle's "signature" can be characterized in terms of the quality of its rendering of a region of a dot pattern, a malfunctioning printer and the cause of the malfunction could be identified through inspection of the images it produces. It would be useful to be able to identify and correct printing errors resulting from a malfunctioning printer before more costly manufacturing errors are incurred.

SUMMARY OF THE INVENTION

Embodiments of the present invention enable image capture and validation. Certain applications of the present invention are its use in various embodiments of a system for inspection of a printed circuit board ("PCB") substrate. In embodiments, an image capture system comprising a camera and a two-dimensional surface supporting an image may be calibrated based on configuration parameters of an image to be captured and of a simulated reference bitmap based on the image. In embodiments, the position of the image to be captured on the two-dimensional surface is determined based on calibration parameters. In embodiments, consistency of quality of captured images is maintained by validating selected characteristics of each image as it is being captured.

In embodiments, a method for capturing a valid snapshot of an image may comprise calculating a first mapping of a first set of configuration parameters of the image to a second set of configuration parameters of a reference bitmap corresponding to the image; calculating a second mapping of the second set of configuration parameters to a third set of configuration parameters of a two-dimensional surface on which the image is located; identifying a first location of a first snapshot on the two-dimensional surface based at least in part on the first set of configuration parameters, the second set of configuration parameters, the third set of configuration parameters, the first mapping, and the second mapping; capturing the first snapshot of the image at the first location on the two-dimensional surface; and storing the valid snapshot corresponding to the first snapshot in response to the first snapshot exceeding an image quality threshold. In embodiments, an alignment validation parameter of a camera may be used to identify the first location of the first snapshot on the two-dimensional surface.

In embodiments, calculating the first location of the first snapshot further may comprise adjusting the first location of the first snapshot to a computed bias of the two-dimensional surface. In embodiments, the first set of configuration parameters may comprise a first set of features extracted from the image and the second set of configuration parameters may comprise a second set of features extracted from the reference bitmap.

In embodiments, the image quality threshold may comprise sharpness of the first snapshot and contrast of the first snapshot. The image quality threshold may be at least partially defined by a comparison of a total number of high-frequency components within the first snapshot to a sharpness threshold value, and the image quality threshold may be at least partially defined by a comparison of an average intensity difference between edge pixels and non-edge pixels within the first snapshot to an intensity difference threshold value.

In embodiments, where the image may be comprised of a set of segments and the valid snapshot is a target segment within the image, storing the valid snapshot may comprise identifying a neighborhood comprising a subset of adjacent segments within the set of segments; extracting the subset of segments from the image; modifying the subset of segments by removing a portion of at least one segment within the subset of segments; integrating the target segment into the modified subset of segments; and integrating the modified subset of segments into the image. Each segment within the neighborhood has a location within a distance threshold of the target segment. Removing a portion of at least one segment is such that a first area of the modified subset of segments corresponds to a second area of the target segment.

In embodiments, a method for calibrating an image capture system may comprise capturing a snapshot of a reference segment of an image that is at a first location within the image; identifying a local view segment of a reference bitmap based on the image that has a second location within the reference bitmap that corresponds to the first location within the image; identifying a third location on a two-dimensional surface supporting the image that corresponds to the first location within the image; calculating a first mapping between the first location and the second location; calculating a second mapping between the second location and the third location; identifying an alignment validation parameter of a camera being based at least in part on the first mapping; and if the alignment validation parameter is less than a validation threshold value, adjusting the third location if a computed bias of the third location on the two-dimensional surface is greater than an adjustment threshold value.

In embodiments, computing the first mapping may comprise extracting a first set of features from the snapshot and a second set of features from the local view segment that corresponds to the first set of features, and calculating the first mapping based on the first set of features and the second set of features. In embodiments, calculating the second mapping is based in part on a set of configuration parameters of the local view segment. In embodiments, the first mapping may be an affine mapping and the second mapping may be an affine mapping.

In embodiments a system for capturing a valid snapshot of an image may comprise a snapshot capturer that receives an image at a first location on a two-dimensional surface supporting the image and a reference bitmap based on the image; and a snapshot validator that receives a first snapshot of the image and stores the valid snapshot corresponding to the first snapshot if the first snapshot exceeds an image quality threshold. The snapshot capturer controls a camera to capture the first snapshot of the image at a first location on the two-dimensional surface. In embodiments, the snapshot capturer is further coupled to receive an exclusion map that identifies the first location.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, and the like. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

Certain applications of the present invention are its use in various embodiments of a system for inspection of a printed circuit board ("PCB") substrate. A PCB pattern may be printed onto a substrate as a dot-pattern image by an industrial ink jet printer; the dot pattern is produced by an array of printer ink nozzles. After some period of continuous use of an ink jet printer, some of its nozzles may become clogged or may malfunction, and this may lead to aberrations in the dot-pattern image being printed. An aberration in a printed PCB pattern may correspond to a circuit defect such as a short or a broken connection.

Figure 1:
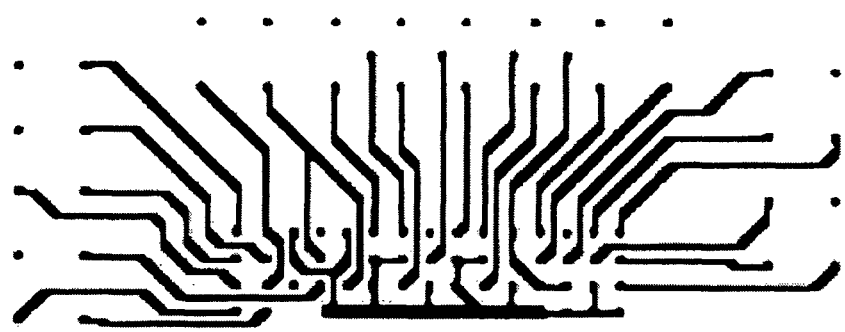
FIG. 1 illustrates examples of a simulated reference bitmap, a reconstructed bitmap image, and a distortion bitmap of a printed PCB pattern according to various embodiments of the invention.
Figure 1:
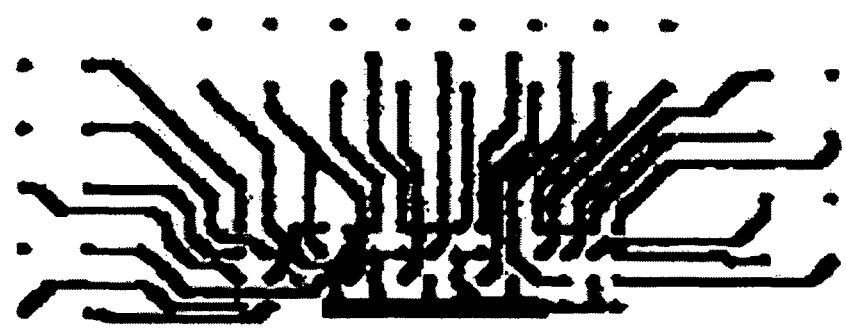
Figure 1:
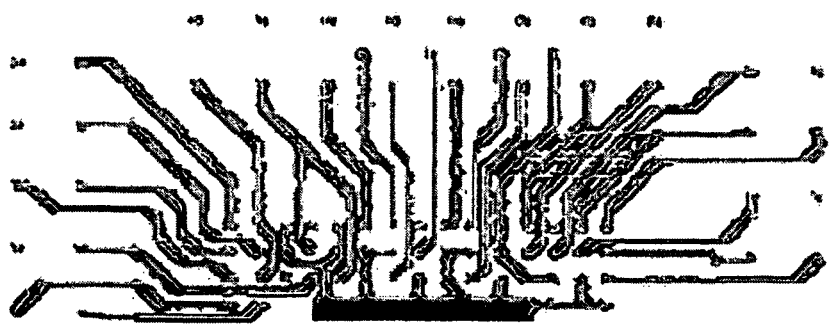

An inspection system is applied to PCB images that have been printed by an ink jet printer. Such an inspection system may enable identification of faults in a printed PCB image and also may enable determination of which nozzles were associated with the locations of the identified faults on the printed image. FIG. 1 illustrates an example of fault detection in a printed PCB image according to various embodiments of the invention. A printed image of a PCB pattern 140 may be compared to a simulated reference bitmap of the PCB pattern 120, and a distortion map 160 that represents differences between the printed image 140 and the reference bitmap 120 may be generated. In embodiments, regions of the distortion map 160 are color coded to facilitate identification of aberrations associated with faults in the printed image 140.

Figure 2A:
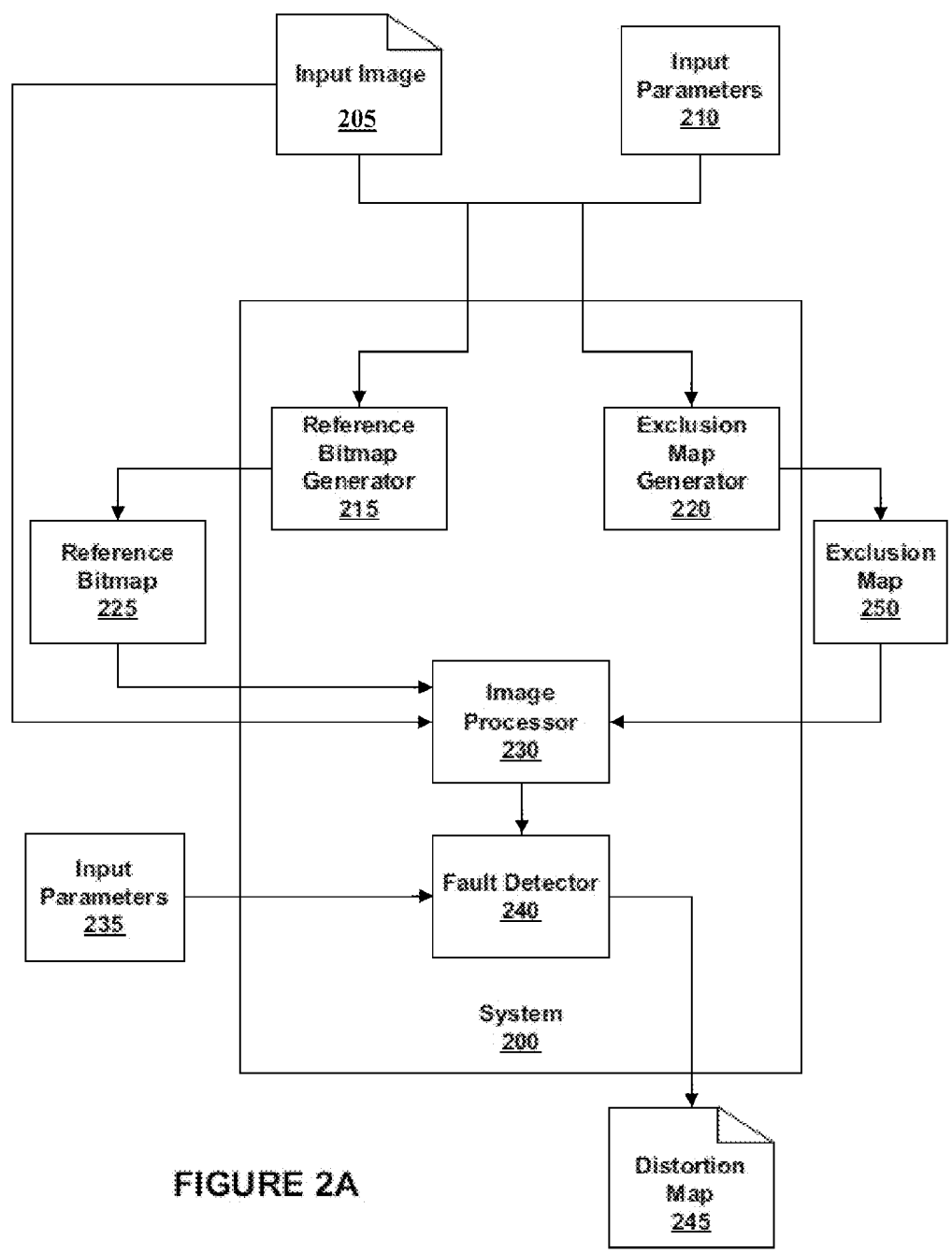
FIG. 2A depicts a block diagram of a system for inspection of a printed PCB bitmap according to various embodiments of the invention.

FIG. 2A depicts a block diagram of a system 200 for inspection of a printed image according to various embodiments of the invention. System 200 receives an input image 205 and compares it to a reference bitmap 225 that is generated based on the input image by a reference bitmap generator 215. The reference bitmap is a simulation of the printed image and is intended to exclude a majority, if not all, of the aberrations that may be caused by the printing of the image on the PCB substrate.

In embodiments, a reference bitmap 225 with a specified configuration may be generated from an input image 205 and user-input parameters 210. The generated reference bitmap 225 may have a different size and configuration from the size and configuration of the input image 205 on which it is based in order to increase the resolution of the reference bitmap 225. In embodiments, user-input parameters 210 are used to compute configuration parameters for the reference bitmap to be generated. User-input parameters 210 may include printer pitch as dots-per-inch (DPI) in the x and y directions, printer droplet size in microns (an inkjet printer nozzle renders a dot as a "droplet" of ink that has an ideal circular shape), and the DPI of the simulated pattern that will be produced. A scaling factor may be computed that relates configuration parameters of the input image 205 to configuration parameters of its reference bitmap 225.

The input image 205 and the reference bitmap 225 are compared by an image processor 230. A fault detector 240, configurable by user-input parameters 235, creates a distortion map 245 of aberrations that may have been discovered during the comparison of the input image 205 with the generated reference bitmap 225. An exemplary distortion map 160 is illustrated in FIG. 1.

The input image 205 may be very large. Large images may be divided into sections, and then selected sections of an image may be compared with corresponding sections of the reference bitmap 225 based on that image. In embodiments, sections to be compared may be selected through user-input parameters 210. An "exclusion map" 250 of the input image that is generated by an exclusion map generator 220 may be used in the selection of sections to compare. An exclusion map identifies areas of non-inspection within an input image 205 such as areas of the background. In embodiments, an image may be reconstructed based on, in part, a set of sections from the image, the input image 205, the reference bitmap 225, and the exclusion map 250. The reconstructed image may become the basis for fault detection as previously described. An exemplary reconstructed PCB pattern image 140 is illustrated in FIG. 1.

A. System Implementations

Figure 2B:
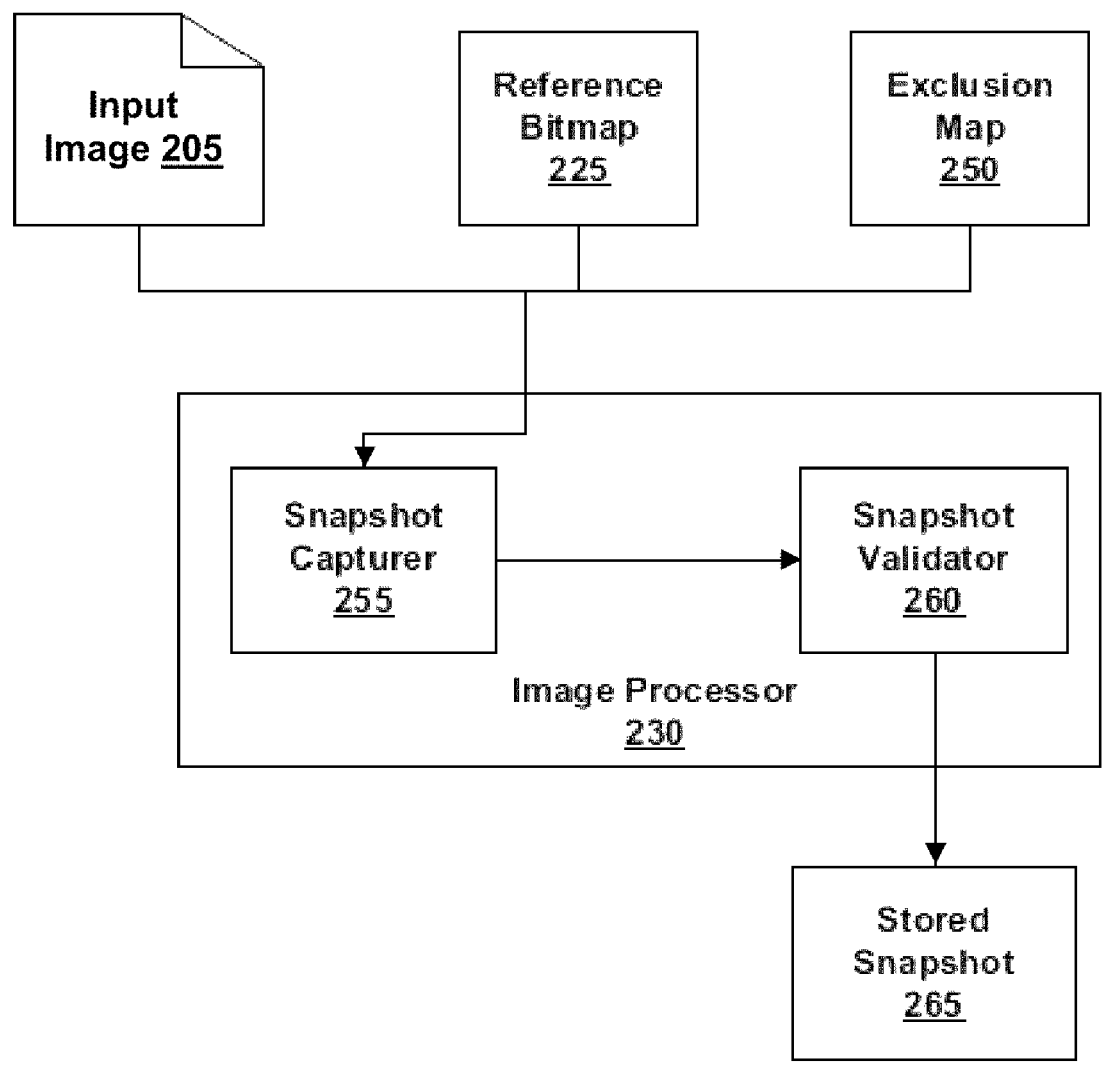
FIG. 2B depicts a block diagram of an image processor system for generating a reconstructed bitmap of a printed image according to various embodiments of the invention.

FIG. 2B depicts a block diagram of an image processor 230 according to various embodiments of the invention. Image processor 230 receives an input image 205 and a reference bitmap 225 that has been generated from the input image, and generates a stored valid snapshot 265 of the input image 205. In embodiments, image processor 230 may receive an exclusion map 250. An image processor 230 may be used in embodiments of inspection system 200 to generate a high-resolution image of the input image 205. In various embodiments, image processor 230 may identify and record the location of an input image 205 that is a section of a large image. The large image may be reconstructed from a set of sections that have been captured and stored.

Figure 3:
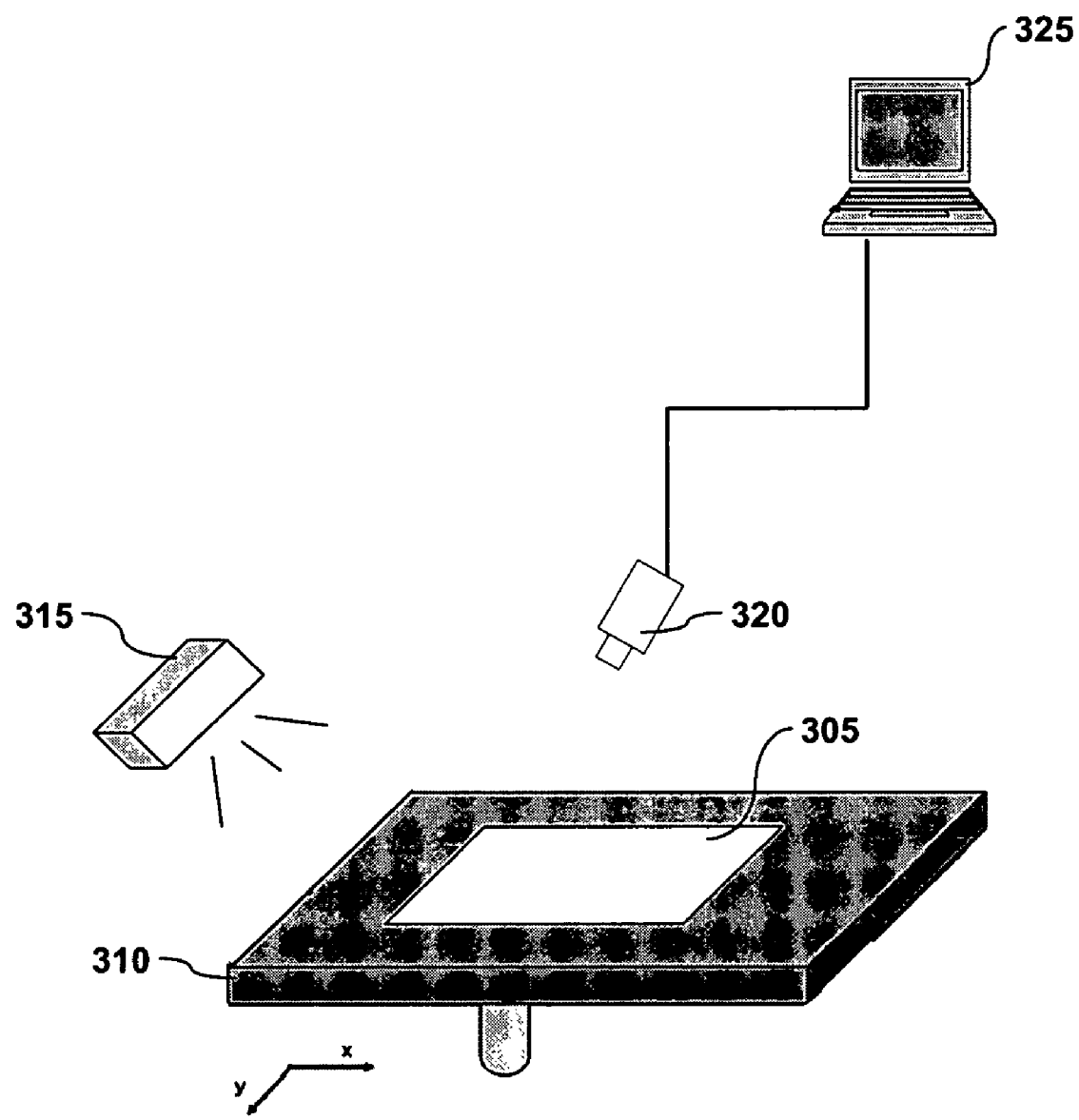
FIG. 3 illustrates an image capture system according to various embodiments of the invention.

FIG. 3 illustrates an exemplary image capture system according to various embodiments of the invention. The image capture system may include a camera 320 that is controlled and positioned by a control arm within a two-dimensional space above an input image 305. In certain embodiments, the position of the camera 320 is fixed by the control arm and the location of the input image 305 is changed relative to the camera position by moving the image on a movable two-dimensional surface 310 (an "xy-table" in various embodiments) that is illuminated by a lighting source 315 so that different sections of the input image may be photographed. In embodiments, sections of an image 305 may be captured and stored if the entire image cannot be captured in a single scan.

In various embodiments of the invention, an image capture system also comprises a computer 325 that is connected to the camera. The computer 325 may provide certain processing functions used to optimize both the focus and exposure setting of the camera 320. In embodiments, storing and processing of images captured by the camera may be performed at the computer 325. A captured printed image may be reconstructed from a set of captured and stored sections of the image.

The snapshot capturer 255 receives an input image 205 and a reference bitmap 225 generated from the input image 205, and produces a captured snapshot of the input image 205. In various embodiments, snapshot capturer 255 may capture a section of the input image 205, and a received exclusion map 250 based on the input image 205 may be used in part to select the section to be captured. As will be described in more detail below, image capture in various embodiments may include initial calibration of the image capture system. This calibration is based at least in part on a comparison between characteristics of an aligned printed image or section of the printed image 305 on the two-dimensional surface 310 and characteristics of its corresponding reference bitmap 225.

In embodiments, snapshot validator 260 receives a captured snapshot and validates the quality of the snapshot based in part on the snapshot's image characteristics that may include contrast and sharpness. In embodiments of an image capture system, image sharpness may be determined from a measurement of the amount of high frequency components in the snapshot, while image contrast may be computed from the average intensity difference around the edges of the snapshot. If the quality of the captured snapshot exceeds a quality threshold, the valid captured snapshot 265 is stored.

B. Methods for Calibrating and Capturing an Image

As was previously discussed, a snapshot of an image may be captured and used in embodiments of an inspection system that detects faults in printed images. If the entire printed image cannot be captured in a single scan, a captured image may be reconstructed from a set of captured and stored sections of the printed image.

Figure 4:
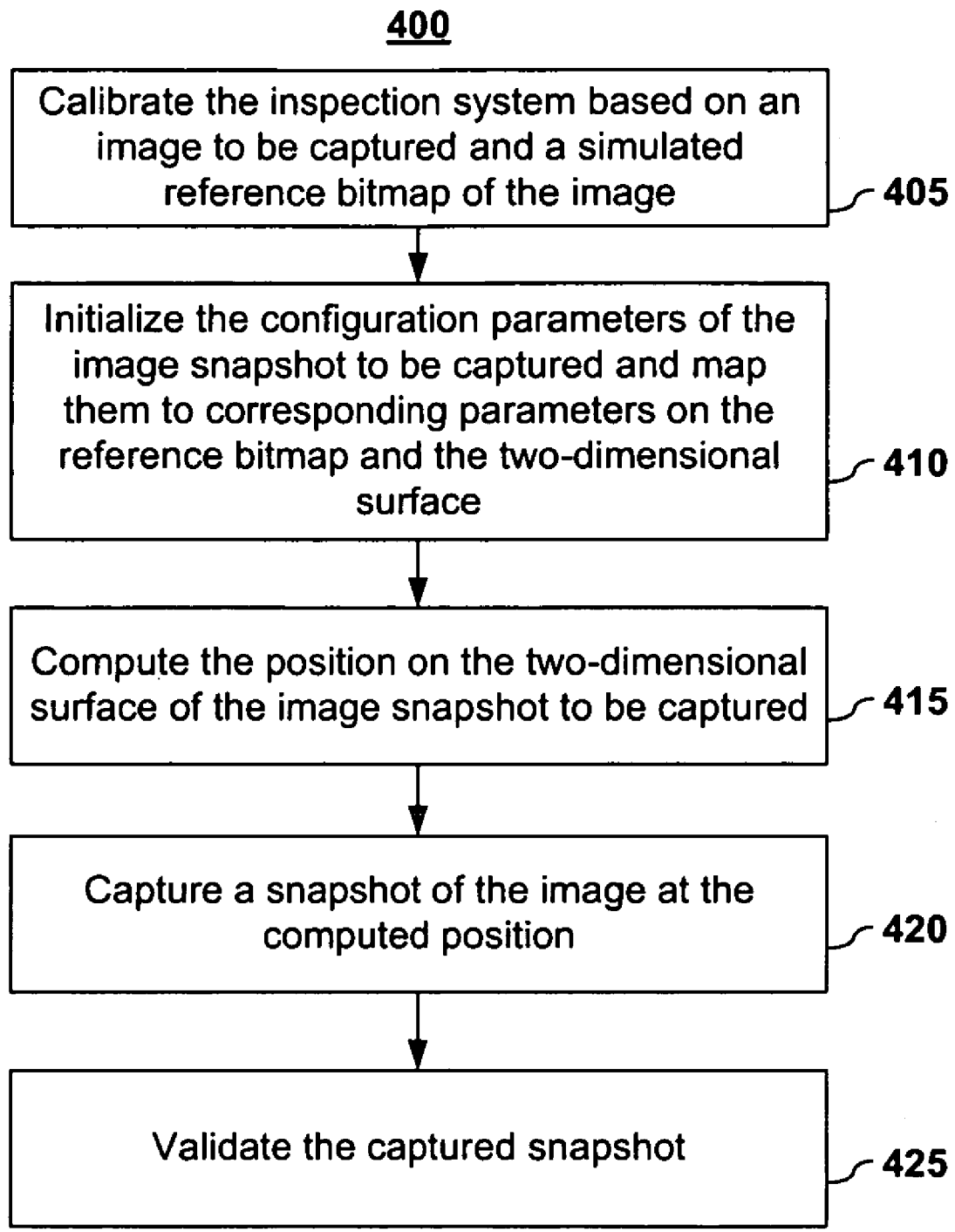
FIG. 4 depicts a method for calibrating and capturing an image according to various embodiments of the invention.

FIG. 4 depicts a method 400, independent of structure, for calibrating and capturing an image according to various embodiments of the invention. Method 400 may be implemented in embodiments of image processor 230 in system 200. Method 400 comprises the steps of calibrating 405 an inspection system based on characteristics of the image snapshot to be captured and a reference bitmap based on the image; initializing 410 the configuration parameters of the image snapshot to be captured and mapping them to corresponding parameters on the reference bitmap and the two-dimensional surface; computing 415 the position on the two-dimensional surface of the image snapshot to be captured; capturing 420 a snapshot of the image at the computed position; and validating 425 the captured snapshot.

1. Calibrating an Inspection System for Image Capture

Figure 5:
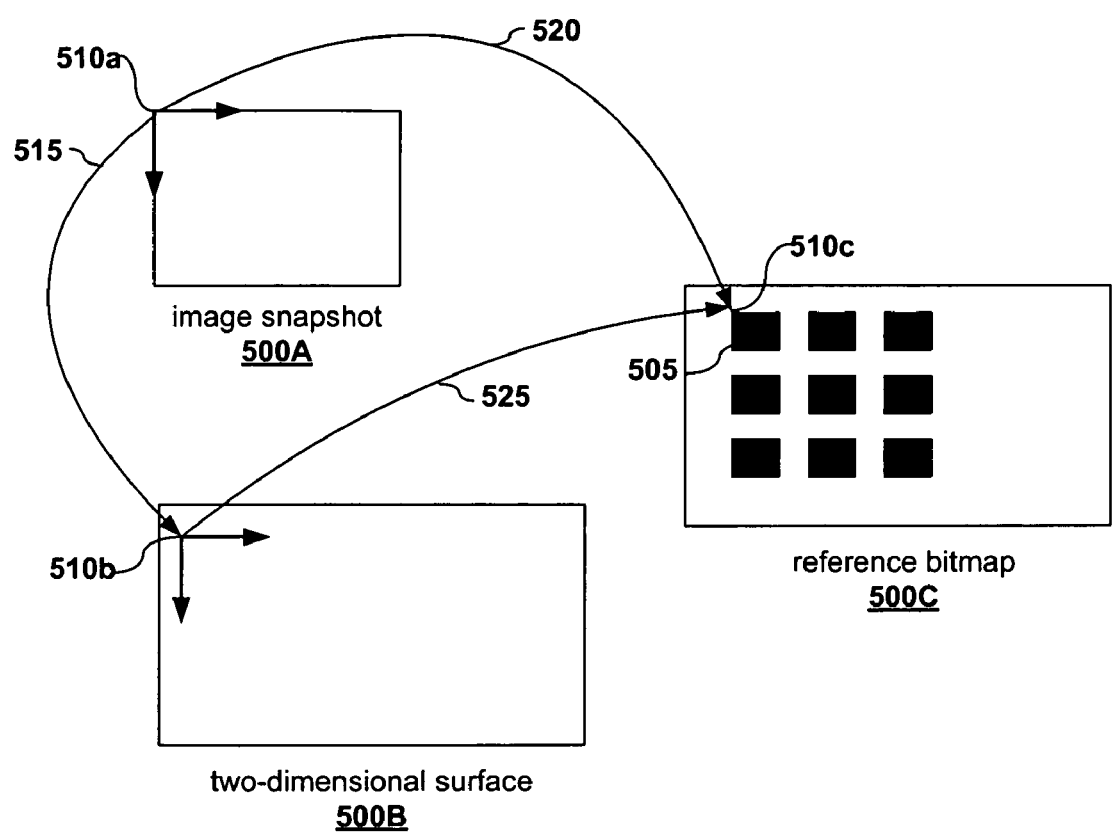
FIG. 5 illustrates an example of the alignment and mapping between an image, a reference bitmap, and a position on an xy-table according to various embodiments of the invention.

FIG. 5 illustrates an example of the alignment and mapping of xy coordinate locations on a reference bitmap 500C, an image snapshot 500A, and a two-dimensional surface 500B according to various embodiments of the invention. In this example, the reference bitmap 500C has been divided into a set of sections; an example of one such section is 505. A reference coordinate (the upper left hand corner of an image snapshot in this example) is identified in each coordinate system ($510c$ on the reference bitmap R; $510a$ on the image snapshot to be captured S; and $510b$ on the two-dimensional surface T). This reference coordinate forms the basis for calibrating 405 the three coordinate systems.

In embodiments, the affine mapping $H_{RS}$ 520 between a location $(x_R, y_R)$ of a pixel on the reference bitmap R and a location $(x_S, y_S)$ of a pixel on the image snapshot S is computed according to the equation:

$$\begin{pmatrix} x_R \\ y_R \\ 1 \end{pmatrix} = H_{RS} \begin{pmatrix} x_S \\ y_S \\ 1 \end{pmatrix}$$

where $$H_{RS} = \begin{pmatrix} \times & \times & \times \\ \times & \times & \times \\ 0 & 0 & 1 \end{pmatrix}$$

In embodiments, a mapping $H_{RT}$ 525 between a location of a coordinate on the reference bitmap R and the location of a corresponding coordinate on the two-dimensional surface T may be based on the measurement of pixel size in the reference bitmap 225 that was computed as a configuration parameter of the reference bitmap 225 when it was generated, as described previously.

Figure 6:
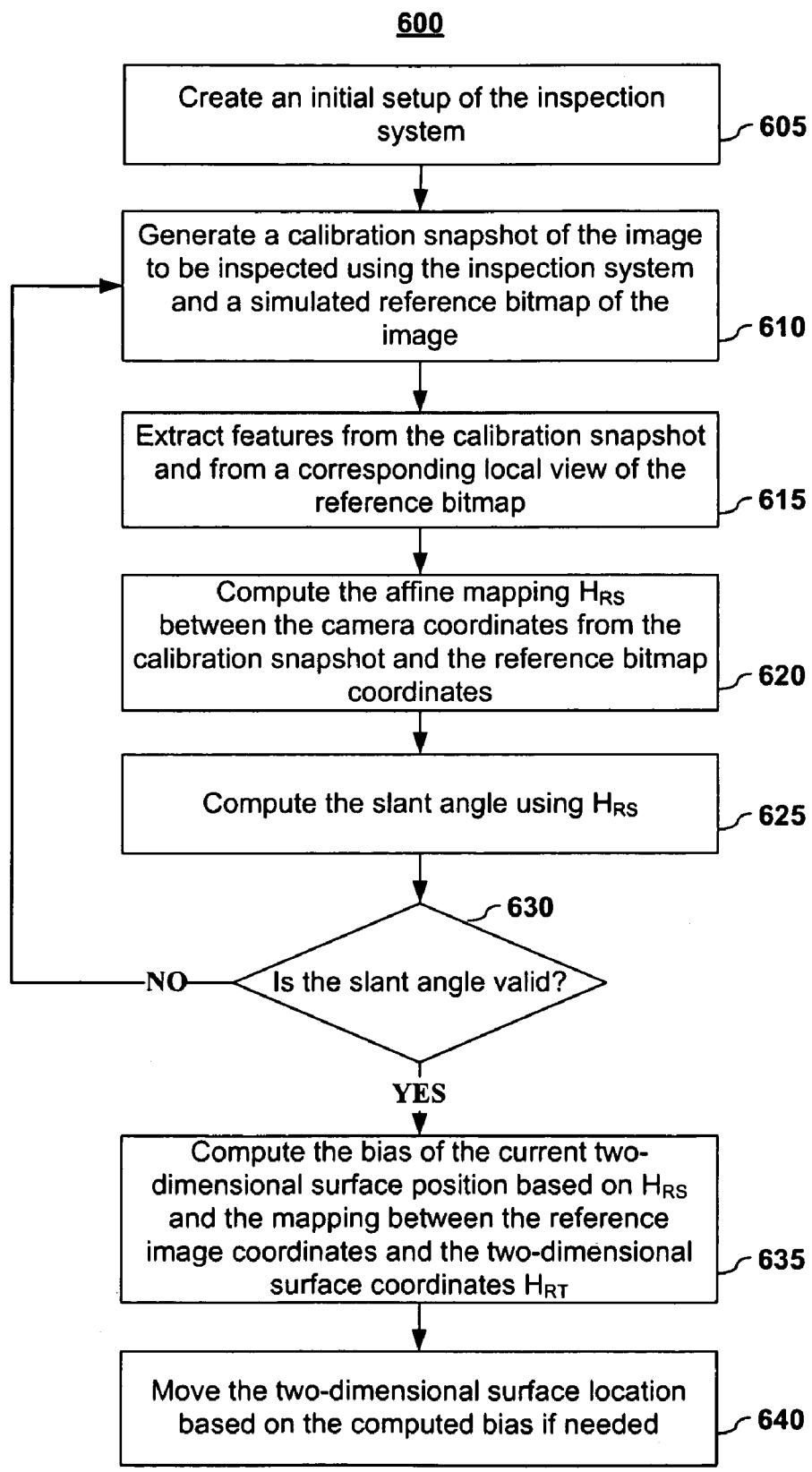
FIG. 6 depicts a method for calibrating an image capture system according to various embodiments of the invention.

FIG. 6 depicts a method 600, independent of structure, for calibration of an image capture system according to various embodiments of the invention. Method 600 may be implemented as step 405 in embodiments of method 400.

A user creates 605 an initial setup of the inspection system by moving the two-dimensional surface 310 to a desired position, setting the focus position of the camera 320, and manually adjusting the view of the simulated reference bitmap stored in memory 325 so that it corresponds in scale and position to the view in the camera 320 of the image to be captured 305. A snapshot of the image and the corresponding view ("local view") of the reference bitmap are captured 610.

In embodiments, features are extracted 615 from the image snapshot and the reference bitmap local view using a feature extractor such as a SIFT feature extractor. Those skilled in the art will recognize that a variety of feature extraction methods exist and that the choice of a feature extractor is not critical to the invention. In embodiments, a least squares method applied to the extracted features may be used to compute 620 an affine mapping $H_{RS}$ between a coordinate on the reference bitmap and a camera coordinate. The mapping $H_{RS}$ may be used to compute 625 the slant angle (alignment validation parameter). In embodiments, the slant angle is validated 630 based upon its size (it is expected to be smaller than a threshold value), and steps 610-625 are repeated until validation succeeds. For example, in an embodiment a valid slant angle is 5 degrees for a 5.5 cm by 5.5 cm substrate. The bias of the current two-dimensional surface location may be computed 635 based on the mappings $H_{RS}$ and $H_{RT}$. If necessary, the two-dimensional surface location may be adjusted 640 based on the computed bias.

2. Image Initialization

In embodiments, the position of an image to be captured on the two-dimensional surface is computed (steps 410 and 415) based at least in part on configuration data derived from generation of a reference bitmap of the image 225 and from calibration of the image capture system. Examples of configuration data that may be used include reference bitmap configuration parameters 520, the mapping $H_{RT}$ 525 between the reference bitmap and the two-dimensional surface, the initial locations on the two-dimensional surface and the reference bitmap 510*b-c*, two-dimensional surface motor step sizes in the x and y directions, the slant angle (alignment validation parameter) computed 625 during calibration, and the width and height of the reference bitmap section 505 corresponding to the image snapshot. Those skilled in the art will recognize that a variety of configuration data exist and that the choice of data to be used in initialization is not critical to the invention.

3. Image Capture and Validation

In embodiments, a snapshot image is captured 420, and the quality of the snapshot is measured 425 to maintain consistency within the set of snapshots being captured on the two-dimensional surface. In various embodiments, quality may be determined by measuring the sharpness and the contrast of a captured snapshot and comparing those values to threshold values. Sharpness of a captured snapshot may be measured by a determination of the amount of high frequency components in the snapshot, while contrast within a captured snapshot may be computed based upon the average intensity difference around the edges detected within the snapshot. For example, in embodiments a quality threshold value is 150.

In embodiments, methods hosted on the camera 320 or hosted on the computer 325 of an inspection system may be used to improve the quality of a captured snapshot in real time by compensating for measured characteristics that do not meet quality standards. For example, contrast may be improved by an auto-exposure method while sharpness may be improved by an auto-focus method.

4. Retrieving or Storing an Image Segment

When an image cannot be captured in a single scan, a set of snapshots of segments of the image may be captured and stored. In embodiments, a stored set of image segments may be used to reconstruct an entire image. A reference bitmap 225 generated from an image may be generated as a set of segments that corresponds to a set of image sections to be captured as snapshots. In embodiments, each segment location within the reference bitmap 225 may correspond to a location within an image where a snapshot is to be captured. Those skilled in the art will recognize that embodiments of the invention may be used to capture a single image, or to capture a segment of an image.

Figure 7:
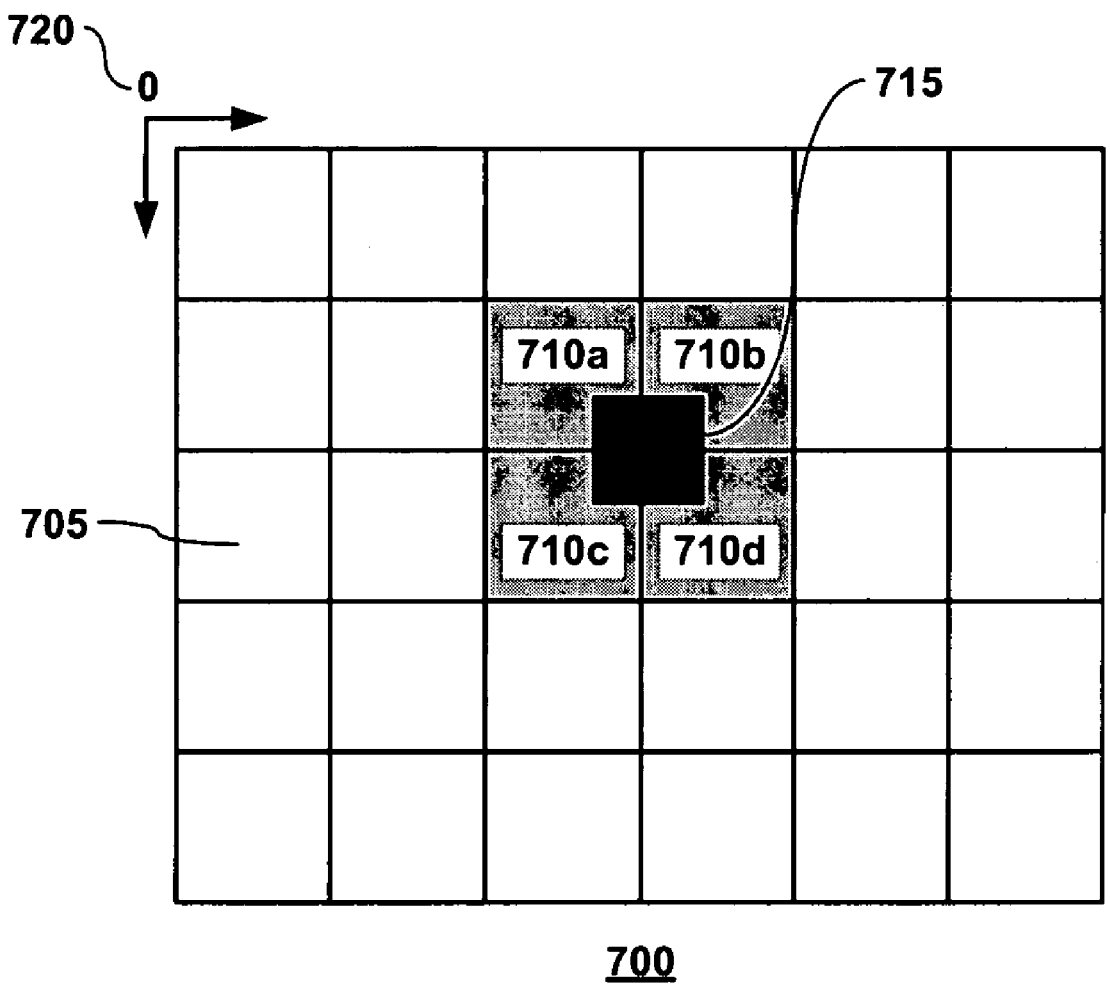
FIG. 7 illustrates a method for retrieving or recording a segment of an image that has been divided into a set of segments according to various embodiments of the invention.

FIG. 7 illustrates a method for retrieving or storing a segment 715 of an image 700 that has been divided into a set of segments according to various embodiments of the invention. Each image segment 705 in the set of segments has a width and a height as well as a segment location expressed as the number of rows r and the number of columns c relative to a coordinate origin. In the example, the coordinate origin 720 is at the upper left hand corner of the image, and the location (r,c) of segment 705 is in the third row of segments and first column of segments relative to the origin 720.

In embodiments of the invention, processing any particular segment of an image need not require retrieving the full set of segments that have been created for that image. For example, in order to access the segment 715 at a location (x,y) within the image 700, the subset of adjacent segments 710*a-d* defining a neighborhood of segments with segment locations (r,c) surrounding location (x,y) is extracted and the segment 715 is accessed (e.g. read or stored) within that neighborhood. Those skilled in the art will recognize that the choice of the size of the subset of adjacent segments is not critical to the invention.

C. Computing System Implementations

It shall be noted that the present invention may be implemented in any instruction-execution/computing device or system capable of processing the data, including without limitation, a general-purpose computer and a specific computer, such as one intended for data processing. The present invention may also be implemented into other computing devices and systems, including without limitation, a digital camera, a printer, a scanner, a multiple function printer/scanner, a facsimile machine, a multimedia device, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 8:
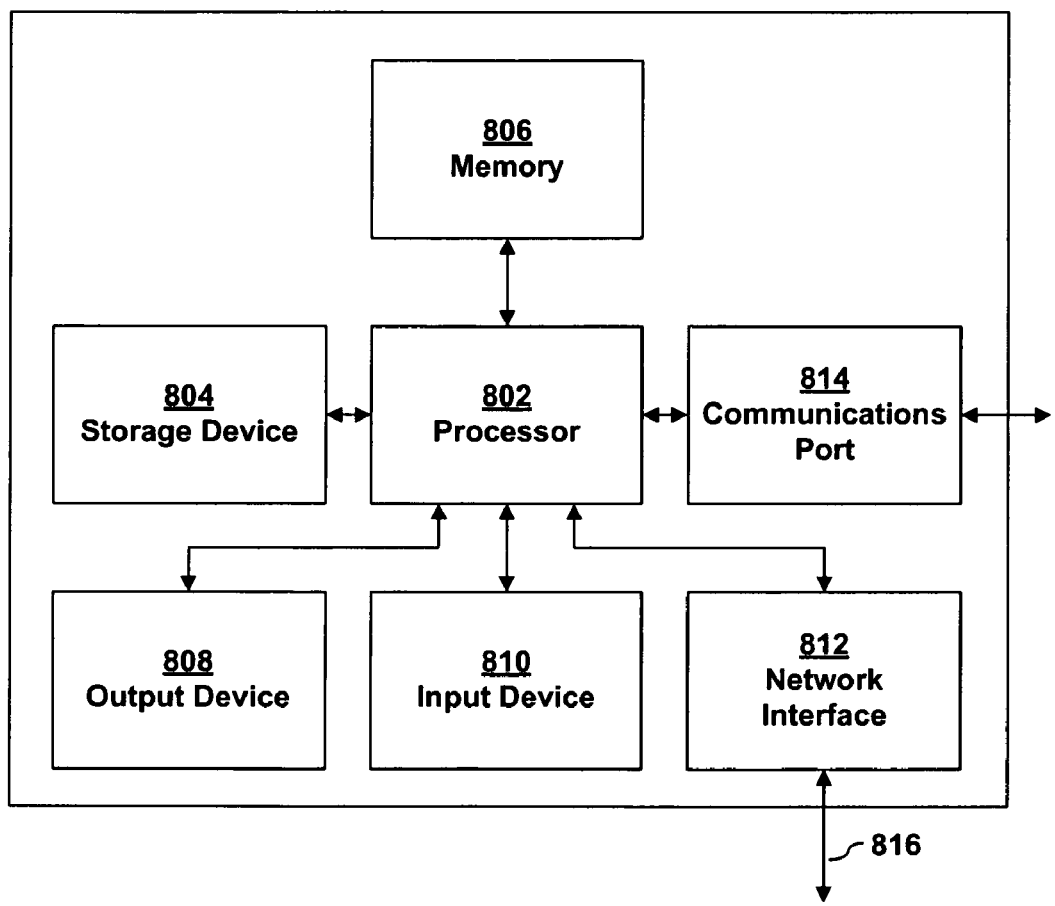
FIG. 8 depicts a block diagram of a computing system.

FIG. 8 depicts a functional block diagram of an embodiment of an instruction-execution/computing device 800 that may implement or embody embodiments of the present invention. As illustrated in FIG. 8, a processor 802 executes software instructions and interacts with other system components. In an embodiment, processor 802 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 804, coupled to processor 802, provides long-term storage of data and software programs. Storage device 804 may be a hard disk drive and/or another device capable of storing data, such as a computer-readable media (e.g., diskettes, tapes, compact disk, DVD, and the like) drive or a solid-state memory device. Storage device 804 may hold programs, instructions, and/or data for use with processor 802. In an embodiment, programs or instructions stored on or loaded from storage device 804 may be loaded into memory 806 and executed by processor 802. In an embodiment, storage device 804 holds programs or instructions for implementing an operating system on processor 802. In one embodiment, possible operating systems include, but are not limited to, UNIX, AIX, LINUX, Microsoft Windows, and the Apple MAC OS. In embodiments, the operating system executes on, and controls the operation of, the computing system 800.

An addressable memory 806, coupled to processor 802, may be used to store data and software instructions to be executed by processor 802. Memory 806 may be, for example, firmware, read only memory (ROM), flash memory, non-volatile random access memory (NVRAM), random access memory (RAM), or any combination thereof. In one embodiment, memory 806 stores a number of software objects, otherwise known as services, utilities, components, or modules. One skilled in the art will also recognize that storage 804 and memory 806 may be the same items and function in both capacities. In an embodiment, one or more of the components of FIGS. 2A and 2B may be modules stored in memory 804, 806 and executed by processor 802.

In an embodiment, computing system 800 provides the ability to communicate with other devices, other networks, or both. Computing system 800 may include one or more network interfaces or adapters 812, 814 to communicatively couple computing system 800 to other networks and devices. For example, computing system 800 may include a network interface 812, a communications port 814, or both, each of which are communicatively coupled to processor 802, and which may be used to couple computing system 800 to other computer systems, networks, and devices.

In an embodiment, computing system 800 may include one or more output devices 808, coupled to processor 802, to facilitate displaying graphics and text. Output devices 808 may include, but are not limited to, a display, LCD screen, CRT monitor, printer, touch screen, or other device for displaying information. Computing system 800 may also include a graphics adapter (not shown) to assist in displaying information or images on output device 808.

One or more input devices 810, coupled to processor 802, may be used to facilitate user input. Input device 810 may include, but are not limited to, a pointing device, such as a mouse, trackball, or touchpad, and may also include a keyboard or keypad to input data or instructions into computing system 800.

In an embodiment, computing system 800 may receive input, whether through communications port 814, network interface 812, stored data in memory 804/806, or through an input device 810, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for capturing a valid snapshot of a printed image, the method comprising:
   calculating a first mapping of at least a first location on an input image from which the printed image is generated to at least a second location on a reference bitmap based on the input image;
   calculating a second mapping of the at least a second location to at least a third location on the printed image;
   identifying a snapshot location on the printed image, where a first snapshot is to be captured based at least in part on the first mapping and the second mapping;
   capturing the first snapshot at the snapshot location; and
   storing the first snapshot as a valid snapshot if the first snapshot exceeds an image quality threshold.

2. The method of claim 1 wherein an alignment validation parameter of a camera is used to identify the snapshot location of the first snapshot on the printed image.

3. The method of claim 1, further comprising:
   computing a bias of the printed image relative to at least the reference bitmap; and prior to storing the first snapshot, adjusting the identified snapshot location on the printed image based on the computed bias of the printed image.

4. The method of claim 1 wherein the input image is comprised of a grid of image segments and the valid snapshot is smaller than the input image, the step of storing the first snapshot comprises:

extracting a minimal subset of adjacent segments within the grid of image segments that collectively contain a first region of the same size and shape as that of the first snapshot;

modifying the extracted minimal subset of adjacent segments by replacing the first region with the snapshot; and modifying the input image by replacing the minimal subset of adjacent segments with the extracted minimal subset of adjacent segments that has been modified.

5. The method of claim 1 wherein the reference bitmap is generated based in part on user-input parameters.

6. The method of claim 1 further comprising:

comparing the first snapshot to the reference bitmap; and generating a distortion map based on the comparison.

7. A computer readable medium having a computer program for performing the method of claim 1.

* * * * *